(12) United States Patent
Konno et al.

(10) Patent No.: US 10,993,028 B2
(45) Date of Patent: Apr. 27, 2021

(54) SOUND PROCESSING DEVICE, VEHICLE AND SOUND PROCESSING METHOD

(71) Applicant: PANASONIC INTELLECTUAL PROPERTY MANAGEMENT CO., LTD., Osaka (JP)

(72) Inventors: Fumiyasu Konno, Osaka (JP); Ichiro Ohno, Osaka (JP); Shinnosuke Nagasawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/822,590

(22) Filed: Mar. 18, 2020

(65) Prior Publication Data

US 2020/0314540 A1 Oct. 1, 2020

(30) Foreign Application Priority Data

Mar. 27, 2019 (JP) .............................. JP2019-059677

(51) Int. Cl.
*H04R 3/12* (2006.01)
*H04R 3/04* (2006.01)
*H04R 5/04* (2006.01)
*B60R 11/02* (2006.01)
*H04R 5/02* (2006.01)

(52) U.S. Cl.
CPC ............ *H04R 3/12* (2013.01); *B60R 11/0217* (2013.01); *B60R 11/0264* (2013.01); *H04R 3/04* (2013.01); *H04R 5/02* (2013.01); *H04R 5/04* (2013.01); *H04R 2499/13* (2013.01)

(58) Field of Classification Search
CPC ... H04R 3/12; H04R 3/04; H04R 5/02; H04R 5/04; H04R 2499/13; B60R 11/0217; B60R 11/0264; B60R 2300/301; B60R 2300/804; B60R 2300/8066
USPC .................. 381/302, 86; 701/1, 70, 96, 119; 181/170, 171, 271
See application file for complete search history.

(56) References Cited

U.S. PATENT DOCUMENTS

| | | | |
|---|---|---|---|
| 2006/0215846 A1 | 9/2006 | Kobayashi et al. | |
| 2009/0052682 A1* | 2/2009 | Kuroiwa | G10K 15/02 381/63 |
| 2014/0300455 A1* | 10/2014 | Tsuzuki | B60L 3/0069 340/425.5 |

(Continued)

FOREIGN PATENT DOCUMENTS

| | | | |
|---|---|---|---|
| JP | 07-322403 | * 12/1995 | |
| JP | 10-290499 | 10/1998 | |

(Continued)

*Primary Examiner* — Norman Yu
(74) *Attorney, Agent, or Firm* — Greenblum & Bernstein, P.L.C.

(57) ABSTRACT

A sound processing device includes: a sound source that outputs a common sound signal to a first speaker for a vehicle exterior and a second speaker for a vehicle interior that are mounted on the vehicle; a notification sound controller that outputs a signal corresponding to a notification sound for notifying an approach of the vehicle to the first speaker based on the sound signal output from the sound source; and an acceleration sound controller that outputs a signal corresponding to an acceleration sound of the vehicle to the second speaker based on the sound signal output from the sound source.

6 Claims, 5 Drawing Sheets

(56) References Cited

U.S. PATENT DOCUMENTS

2019/0009717 A1     1/2019   Nagasawa et al.

FOREIGN PATENT DOCUMENTS

| JP | 2006-301598 | 11/2006 |
|----|-------------|---------|
| WO | 2017/125990 | 7/2017 |

* cited by examiner

SOUND PROCESSING DEVICE, VEHICLE AND SOUND PROCESSING METHOD

CROSS REFERENCE TO RELATED APPLICATION

The present application is based on and claims priority of Japanese Patent Application No. 2019-059677 filed on Mar. 27, 2019.

FIELD

The present disclosure relates to a sound processing device mounted on a vehicle, a vehicle equipped with the sound processing device, and a sound processing method.

BACKGROUND

Since electric vehicles and hybrid vehicles have low noise, there is a problem that pedestrians and the like are unlikely to notice the approach of the vehicle when the vehicle is in motion at a low speed with a low road noise of the own vehicle. For this reason, low-noise vehicles such as electric vehicles and hybrid vehicles are provided with a vehicle proximity notification device that warns a pedestrian or the like of approaching the vehicle by outputting a sound (also referred to as a notification sound) reminding the travelling state of the vehicle in motion (for example, see Patent Literature (PTL) 1 and 2).

In addition, there is also a problem that the acceleration sound in motion is so small that the passengers cannot get a sense of unity with the vehicle because electric vehicles and hybrid vehicles have low noise. For this reason, an effect sound generating device that detects acceleration and deceleration of a vehicle and generates a sound effect (acceleration sound) in accordance with the amount of acceleration and deceleration in the vehicle interior to enhance the dramatic effect is disclosed (for example, PTL 3).

CITATION LIST

Patent Literature

PTL 1: Japanese Unexamined Patent Application Publication No. H10-290499
PTL 2: Japanese Unexamined Patent Application Publication No. H7-322403
PTL 3: Japanese Unexamined Patent Application Publication No. 2006-301598

SUMMARY

Technical Problem

However, the devices according to PTL 1 to PTL 3 can be improved upon.

In view of this, the present disclosure provides a sound processing device capable of improving upon the above related art.

Solution to Problem

A sound processing device according to an embodiment of the present disclosure includes: a sound source that outputs a sound signal to a first speaker for an exterior of a vehicle and a second speaker for a vehicle interior that are provided in the vehicle, the sound signal being common to the first speaker and the second speaker; a notification sound controller that outputs a signal corresponding to a notification sound for notifying approach of the vehicle to the first speaker based on the sound signal output from the sound source; and an acceleration sound controller that outputs a signal corresponding to an acceleration sound of the vehicle to the second speaker based on the sound signal output from the sound source.

Note that these general or specific aspects may be realized by a system, a method, an integrated circuit, a computer program or a recording medium such as a computer-readable CD-ROM, and may be realized by any combination of the system, the method, the integrated circuit, the computer program and the recording medium.

Advantageous Effects

A sound processing device according to an aspect of the present disclosure is capable of improving upon the above related art.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
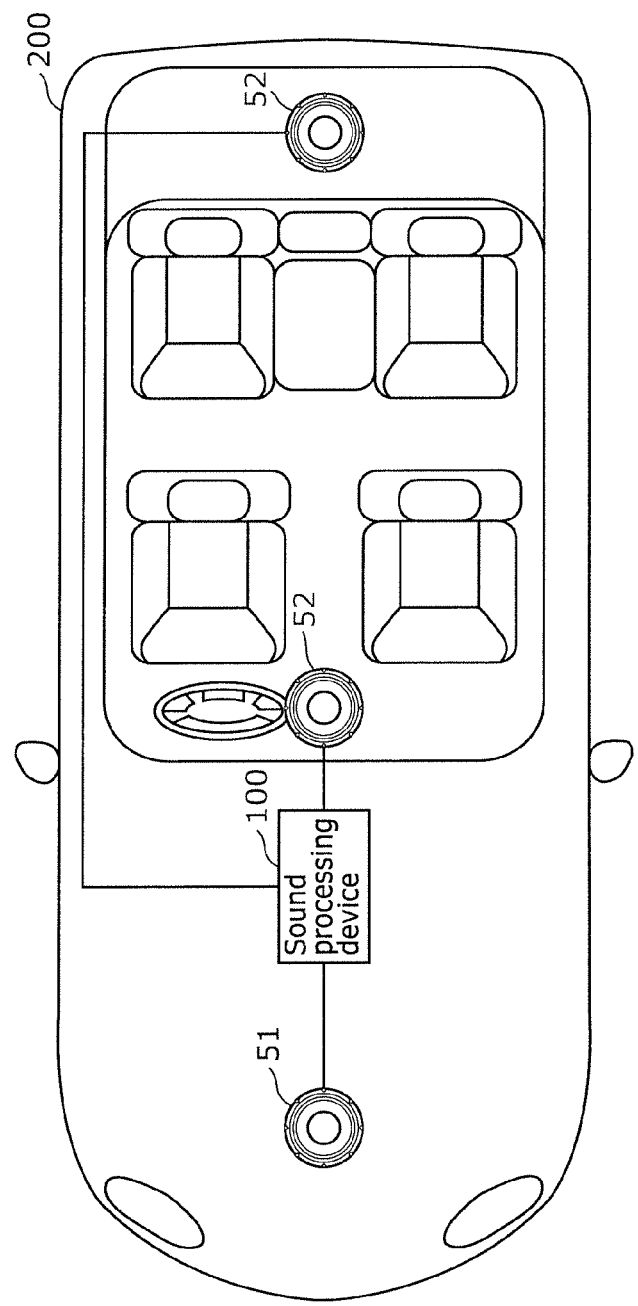
FIG. 1 is a schematic diagram of a vehicle including a sound processing device according to an embodiment.

Underlying Knowledge Forming Basis of the Present Disclosure

Conventionally, a vehicle proximity notification device and a system for reproducing a comfortable acceleration sound in a low-noise vehicle interior of an electric vehicle, a hybrid vehicle and the like are separately mounted, and since the respective sounds or frequencies are different, the notification sound leaking into the vehicle interior and the acceleration sound output into the vehicle interior may be mixed to generate a dissonant sound (for example, a beat sound), which may cause discomfort given to the passengers. For example, such a measure has been taken that no acceleration sound is output while outputting the notification sound so as not to cause discomfort given to the passenger. However, in this measure, there is a problem that the passengers cannot receive any effect due to the acceleration sound while notification sound is output.

In the following embodiment, a sound processing device or the like that can output a notification sound to the outside of a vehicle and reduce discomfort given to passengers when outputting an acceleration sound to the vehicle interior will be described.

A sound processing device according to an aspect of the present disclosure includes: a sound source that outputs a sound signal to a first speaker for an exterior of a vehicle and a second speaker for a vehicle interior that are provided in the vehicle, the sound signal being common to the first speaker and the second speaker; a notification sound controller that outputs a signal corresponding to a notification sound for notifying approach of the vehicle to the first speaker based on the sound signal output from the sound source; and an acceleration sound controller that outputs a signal corresponding to an acceleration sound of the vehicle to the second speaker based on the sound signal output from the sound source.

According to this, since the notification sound and the acceleration sound are generated from the common sound signal output from one sound source, even when the notification sound and the acceleration sound are simultaneously output and mixed in the vehicle interior, since each sound signal is originally a common sound signal, generation of a sound such as a dissonant sound can be suppressed. In other words, the notification sound and the acceleration sound can be harmonized. For this reason, it is possible to reduce discomfort given to the passengers when outputting the notification sound to the outside of the vehicle and outputting the acceleration sound to the vehicle interior.

In addition, the sound processing device further includes a filter that has a pass band that is a predetermined frequency band, wherein the notification sound controller may output a signal corresponding to the notification sound to the first speaker based on the sound signal output from the sound source and passing through the filter.

According to this, the generation of the notification sound and the acceleration sound from a common sound signal is facilitated by passing through the component corresponding to the notification sound by the filter from the sound signal including the component corresponding to the acceleration sound and the component corresponding to the notification sound.

In addition, the notification sound controller and the acceleration sound controller may each process the sound signal output from the sound source, so as to change a pitch of the notification sound and a pitch of the acceleration sound at a same ascending rate in accordance with acceleration of the vehicle, respectively, and change the pitch of the notification sound and the pitch of the acceleration sound at a same descending rate in accordance with deceleration of the vehicle, respectively.

Normally, the pitch of the engine sound and the like rises with the acceleration of the vehicle. Therefore, the pitch of the output acceleration sound is also raised so as to resemble the actual engine sound and the like. On the other hand, the pitch of the notification sound may be raised with the acceleration of the vehicle. At this time, when the ascending rates or descending rates of the pitches of the notification sound and the acceleration sound with respect to the vehicle speed are different from each other, the notification sound and the acceleration sound having different pitches may be mixed to generate a sound like a dissonant sound. Therefore, the sound signal output from the sound source is processed such that the pitches of the notification sound and the acceleration sound change at the same ascending rate in accordance with the acceleration of the vehicle, respectively, and the pitches of the notification sound and the acceleration sound change at the same descending rate in accordance with the deceleration of the vehicle, respectively. Thereby, even when the pitches of the notification sound and the acceleration sound are changed in accordance with the vehicle speed, it is possible to suppress the generation of a sound like a dissonant sound.

In addition, the acceleration sound controller may process the sound signal output from the sound source to monotonically increase a sound pressure obtained by summing a sound pressure of the notification sound leaking into the vehicle interior and a sound pressure of the acceleration sound output into the vehicle interior in accordance with acceleration of the vehicle, and monotonously decrease the sound pressure obtained by summing in accordance with deceleration of the vehicle.

Generally, when the vehicle speed increases, road noise (tire pattern noise, etc.) generated from the vehicle also increases. Therefore, it is possible to notify the approach of the vehicle by the road noise without notifying the notification sound to the outside of the vehicle. In other words, when the vehicle speed is low, the notification sound is issued to the outside of the vehicle because the road noise is small. For this reason, when the vehicle speed increases from a low speed, the notification sound is often output while fading out, and when the vehicle speed decreases from a high speed, the notification sound is often output while fading in. Thereby, in the vehicle interior, the notification sound that leaks decreases as the vehicle speed increases, and the notification sound that leaks increases as the vehicle speed decreases. At this time, the sound pressure obtained by summing the sound pressure of the notification sound leaking into the vehicle interior and the sound pressure of the acceleration sound output into the vehicle interior temporarily decreases due to the fade-out of the notification sound, temporarily increases due to the fade-in of the notification sound, and the passengers hear the sound heard in the vehicle interior suddenly as small or large. For this reason, the passengers feel uncomfortable. Therefore, by processing the sound signal output from sound source such that the sound pressure obtained by summing monotonically increases in accordance with the acceleration of the vehicle or the sound pressure obtained by summing monotonously decreases in accordance with the deceleration of the vehicle, even if the notification sound fades out or fades in, the passengers can hear a sound with a constant ascending or descending rate of the sound pressure, so that it is possible to prevent the passengers from feeling uncomfortable.

In addition, the sound processing device further includes a failure detector that detects a failure of the first speaker, wherein when the acceleration sound controller detects the failure of the first speaker, the acceleration sound controller may output a sound signal indicating that the first speaker has failed to the second speaker.

According to this, it is possible to notify the passengers in the vehicle interior that the first speaker that outputs the notification sound has failed by the second speaker that outputs the acceleration sound.

A vehicle according to an aspect of the present disclosure includes the sound processing device described above; the first speaker; and the second speaker.

According to this, it is possible to provide a vehicle capable of outputting a notification sound to the outside of the vehicle and reducing discomfort given to passengers when outputting an acceleration sound to the vehicle interior.

The sound processing method according to an aspect of the present disclosure may include outputting a sound signal to a first speaker for a vehicle exterior and a second speaker for a vehicle interior that are provided in the vehicle, the sound signal being common to the first speaker and the second speaker; outputting a signal corresponding to a notification sound for notifying approach of the vehicle based on the sound signal output; and outputting a signal corresponding to an acceleration sound of the vehicle to the second speaker based on the sound signal output.

According to this, it is possible to provide a sound processing method capable of outputting a notification sound to the outside of the vehicle and reducing discomfort given to the passengers when outputting an acceleration sound to the vehicle interior.

Hereinafter, embodiments of the present disclosure will be described with reference to the drawings. Note that each of the embodiments described below shows a specific example of the present disclosure. Numerical values, shapes, materials, components, arrangement positions and connection forms of components, steps, order of steps, and the like shown in the following embodiments are merely examples, and are not intended to limit the present disclosure. In addition, among the components in the following embodiments, components not described in the independent claims indicating the highest concept are described as arbitrary components.

Embodiment

In the embodiment, a sound processing device mounted on a vehicle will be described.

FIG. 1 is a schematic diagram of vehicle 200 including sound processing device 100 according to the embodiment. FIG. 1 is a top perspective view in which the ceiling of vehicle 200 is transparent, and shows the interior of vehicle 200.

As shown in FIG. 1, vehicle 200 includes sound processing device 100, first speaker 51, and second speaker 52. Vehicle 200 is specifically an automobile, but is not particularly limited. In vehicle 200, the notification sound output from first speaker 51 is generated toward a pedestrian or the like outside the vehicle, so first speaker 51 is installed, for example, outside the vehicle. In addition, in vehicle 200, the acceleration sound output from second speaker 52 is generated toward the passengers in the interior of vehicle 200, so second speaker 52 is arranged, for example, in the vehicle interior. Here, the second speakers 52 are arranged in the front and rear in the interior of vehicle 200, respectively, but the number and positions of the second speakers 52 arranged in the vehicle interior are not particularly limited. Note that vehicle 200 may include a speaker that outputs a notification sound in addition to first speaker 51, or may include a speaker that outputs an acceleration sound in addition to second speaker 52.

Next, the configuration of sound processing device 100 according to the present embodiment will be described.

Figure 2:
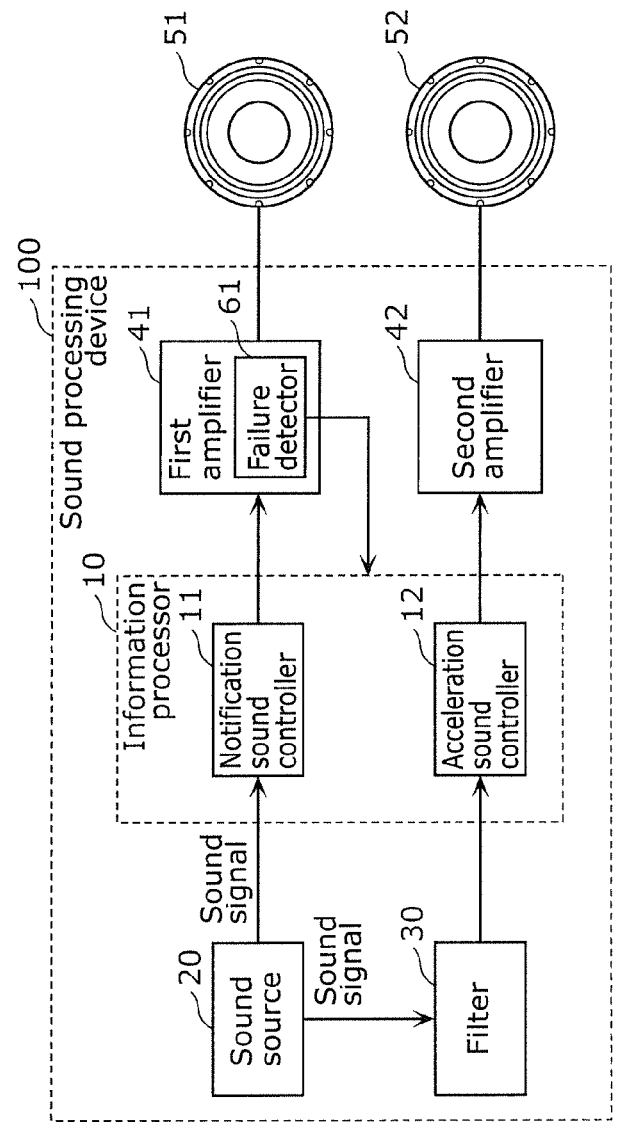
FIG. 2 is a block diagram showing an example of a configuration of a sound processing device according to the embodiment.

FIG. 2 is a block diagram showing a configuration of sound processing device 100 according to the present embodiment.

As shown in FIG. 2, sound processing device 100 includes information processor 10, sound source 20, filter 30, first amplifier 41, and second amplifier 42. Information processor 10 includes notification sound controller 11 and acceleration sound controller 12. Note that FIG. 2 also shows first speaker 51 and second speaker 52 which are provided in vehicle 200.

Sound processing device 100 is a device for notifying the approach of vehicle 200 using first speaker 51 mounted on vehicle 200, and also for generating an acceleration sound in the vehicle interior using second speaker 52 to enhance the effect. Sound processing device 100 notifies the approach of vehicle 200 by causing first speaker 51 to output a notification sound (for example, a warning sound) toward a pedestrian or the like outside the vehicle. In addition, sound processing device 100 enhances the effect in the vehicle interior by causing second speaker 52 to output an acceleration sound toward the passengers in the vehicle interior.

Sound source 20 outputs a common sound signal to first speaker 51 for the vehicle exterior and second speaker 52 for the vehicle interior that are mounted on vehicle 200. The sound signal output from sound source 20 includes a component corresponding to the acceleration sound and a component corresponding to the notification sound. In the present embodiment, a first path from sound source 20 to first speaker 51 via notification sound controller 11 and first amplifier 41, and a second path from sound source 20 to second speaker 52 via filter 30, acceleration sound controller 12 and second amplifier are provided and a sound signal is output from sound source 20 to each of the first path and the second path. Sound source 20 may be realized by, for example, a storage device (not shown).

Filter 30 is a filter that is provided between sound source 20 and acceleration sound controller 12 in the second path, and passes a predetermined frequency band (for example, a frequency band corresponding to a notification sound). Note that filter 30 may be a band-pass filter, a low-pass filter, or a high-pass filter as long as the filter passes a frequency band corresponding to the notification sound. In the present embodiment, filter 30 is, for example, a low-pass filter. By causing filter 30 to pass the component corresponding to the notification sound from the sound signal including the component corresponding to the acceleration sound and the component corresponding to the notification sound, the generation of the notification sound is facilitated. Note that sound processing device 100 may not include filter 30.

First amplifier 41 is connected between notification sound controller 11 and first speaker 51. First amplifier 41 amplifies the sound signal output from sound source 20 and processed by notification sound controller 11 at a predetermined amplification degree, and outputs the amplified sound signal to first speaker 51. First amplifier 41 includes failure detector 61 that detects a failure of first speaker 51. When detecting a failure in first speaker 51, failure detector 61 notifies information processor 10 of a signal indicating the detection.

Second amplifier 42 is connected between acceleration sound controller 12 and second speaker 52. Second amplifier 42 amplifies the sound signal output from sound source 20 and processed by acceleration sound controller 12 at a predetermined amplification degree, and outputs the amplified sound signal to second speaker 52. The amplification at this time may be the same as or different from the amplification of first amplifier 41. Although not shown, second amplifier 42 may include a failure detector that detects a failure of second speaker 52. When detecting a failure of second speaker 52, the failure detector notifies information processor 10 of a signal indicating that.

Note that first amplifier 41 and second amplifier 42 may be analog amplifiers or digital amplifiers.

First speaker 51 and second speaker 52 have a function of converting an electric signal into a mechanical vibration, and output a sound based on the electric signal. First speaker 51 is a speaker for the exterior of the vehicle mounted on vehicle 200, and outputs a notification sound for notifying the approach of vehicle 200 to the outside of vehicle 200. Second speaker 52 is a speaker for the vehicle interior, and outputs an acceleration sound for enhancing the effect in the interior of vehicle 200 to the vehicle interior. The notification sound and the acceleration sound are, for example, engine sounds. In this case, sound source 20 often uses a pseudo engine sound or an electronic sound, and is composed of, for example, a low-pitched portion of 300 Hz to 700 Hz and a frequency component of 1 kHz to 3 kHz.

Information processor 10 is realized by, for example, a microcomputer (microcontroller). The microcomputer is a semiconductor integrated circuit and the like having a ROM, a RAM storing a program, a processor (CPU: Central Processing Unit) that executes the program, and the like. For example, notification sound controller 11 and acceleration sound controller 12 are realized by the processor executing the program. Details of notification sound controller 11 and acceleration sound controller 12 will be described with reference to FIG. 3 in conjunction with the description of the operation of sound processing device 100.

Figure 3:
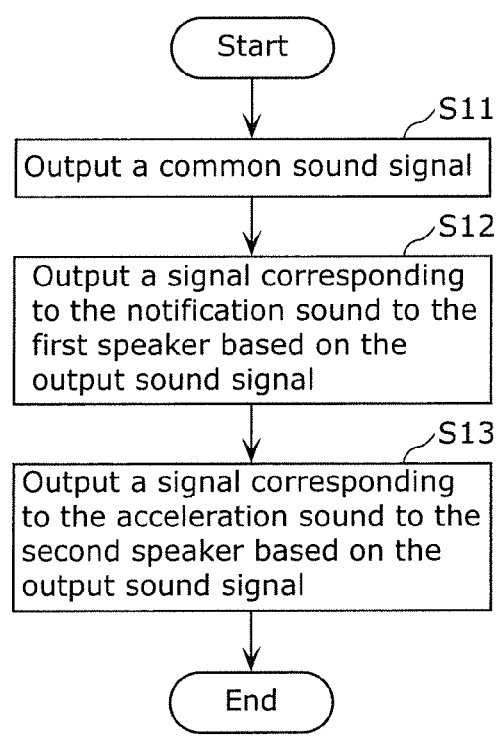
FIG. 3 is a flowchart showing an example of the operation of the sound processing device according to the embodiment.

FIG. 3 is a flowchart showing an example of the operation of sound processing device 100 according to the embodiment.

Sound source 20 outputs a common sound signal to first speaker 51 and second speaker 52 (step S11). Specifically, sound source 20 outputs a sound signal to first speaker 51 via information processor 10 (notification sound controller 11) and first amplifier 41, and to second speaker 52 via filter 30 and information processor 10 (acceleration sound controller 12) and second amplifier 42. The source of the sound (notification sound) output from first speaker 51 and the sound (acceleration sound) output from second speaker 52 is common sound source 20.

Notification sound controller 11 outputs a signal corresponding to a notification sound for notifying the approach of vehicle 200 to first speaker 51 based on the sound signal output from sound source 20 (step S12). In the present embodiment, since sound processing device 100 includes, for example, filter 30, notification sound controller 11 outputs a signal corresponding to the notification sound to first speaker 51 based on the sound signal output from sound source 20 and passing through filter 30.

Acceleration sound controller 12 outputs a signal corresponding to the acceleration sound of vehicle 200 to second speaker 52 based on the sound signal output from sound source 20 (step S13).

As described above, since the notification sound and the acceleration sound are generated from the common sound signal output from one sound source 20, even when the notification sound and the acceleration sound are simultaneously output and mixed in the vehicle interior, each was originally a common sound signal, so the generation of a sound like a dissonant sound (for example, a beat sound) can be suppressed. In other words, the notification sound and the acceleration sound can be harmonized. For this reason, it is possible to reduce discomfort given to the passengers when outputting the notification sound to the outside of the vehicle and outputting the acceleration sound to the vehicle interior. Here, the frequency characteristics of the notification sound output from first speaker 51 and the acceleration sound output from second speaker 52 will be described with reference to FIG. 4.

Figure 4:
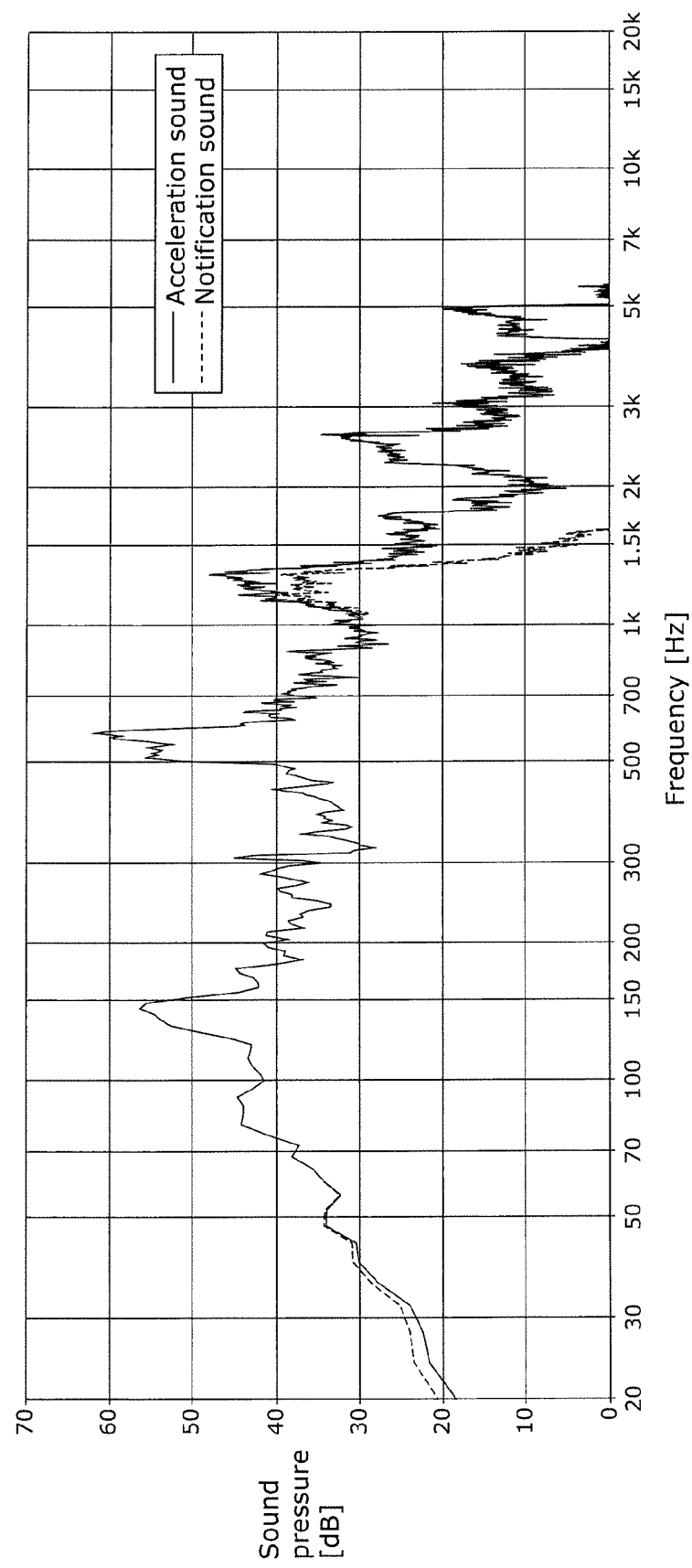
FIG. 4 is a graph showing an example of the frequency characteristics of the notification sound and the acceleration sound output from the first speaker and the second speaker according to the embodiment.

FIG. 4 is a graph showing an example of the frequency characteristics of the notification sound and the acceleration sound output from first speaker 51 and second speaker 52 according to the embodiment.

As shown in FIG. 4, it can be seen that the frequency characteristic of the acceleration sound includes a frequency component that is an integral multiple of the fundamental frequency in the frequency characteristic of the notification sound. This is because the notification sound and the acceleration sound are originally a common sound signal. Therefore, even when the notification sound leaks from outside the vehicle with respect to the acceleration sound output into the vehicle interior and the notification sound and the acceleration sound are mixed, the generation of a sound like a dissonance sound can be suppressed. In addition, as shown in FIG. 4, the frequency characteristic of the notification sound is such that the frequency band of about 1.5 kHz or more in the frequency characteristic of the acceleration sound is cut off by filter 30, and it can be seen that the generation of a notification sound and an acceleration sound from a common sound signal is facilitated by using filter 30.

Note that the processing in step S12 and the processing in step S13 may be performed simultaneously, or the processing in step S12 may be performed after the processing in step S13 is performed.

In addition, in step S12 and step S13, information processor 10 (notification sound controller 11 and acceleration sound controller 12) may process the sound signals output from sound source 20, respectively, such that, for example, the pitches of the notification sound and the acceleration sound change at the same ascending rate in accordance with the acceleration of vehicle 200, and the pitches of the notification sound and the acceleration sound change at the same descending rate in accordance with the deceleration of vehicle 200. Information processor 10 can perform processing in accordance with the acceleration and deceleration of vehicle 200 by acquiring the speed of vehicle 200 from, for example, an ECU (Electronic Control Unit) or the like.

Normally, the pitch of the engine sound and the like rises with the acceleration of vehicle 200. Therefore, the pitch of the output acceleration sound is also raised so as to resemble the actual engine sound and the like. On the other hand, the pitch of the notification sound may be raised with the acceleration of vehicle 200. At this time, when the ascending rates or descending rates of the pitches of the notification sound and the acceleration sound with respect to the vehicle speed are different from each other, the notification sound and the acceleration sound having different pitches may be mixed to generate a sound like a dissonant sound. Therefore, the sound signal output from sound source 20 is processed such that the pitches of the notification sound and the acceleration sound change at the same ascending rate in accordance with the acceleration of vehicle 200, respectively, and the pitches of the notification sound and the acceleration sound change at the same descending rate in accordance with the deceleration of vehicle 200, respectively. Thereby, even when the pitches of the notification sound and the acceleration sound are changed in accordance with the vehicle speed, it is possible to suppress the generation of a sound like a dissonant sound.

In addition, in step S13, acceleration sound controller 12 may process the sound signal output from sound source 20 such that the sound pressure obtained by summing the sound pressure of the notification sound leaking into the vehicle interior and the sound pressure of the acceleration sound output into the vehicle interior monotonously increases in accordance with the acceleration of vehicle 200, and the sound pressure obtained by summing decreases in accordance with the deceleration of vehicle 200. This will be described with reference to FIGS. 5A and 5B.

Figure 5A:
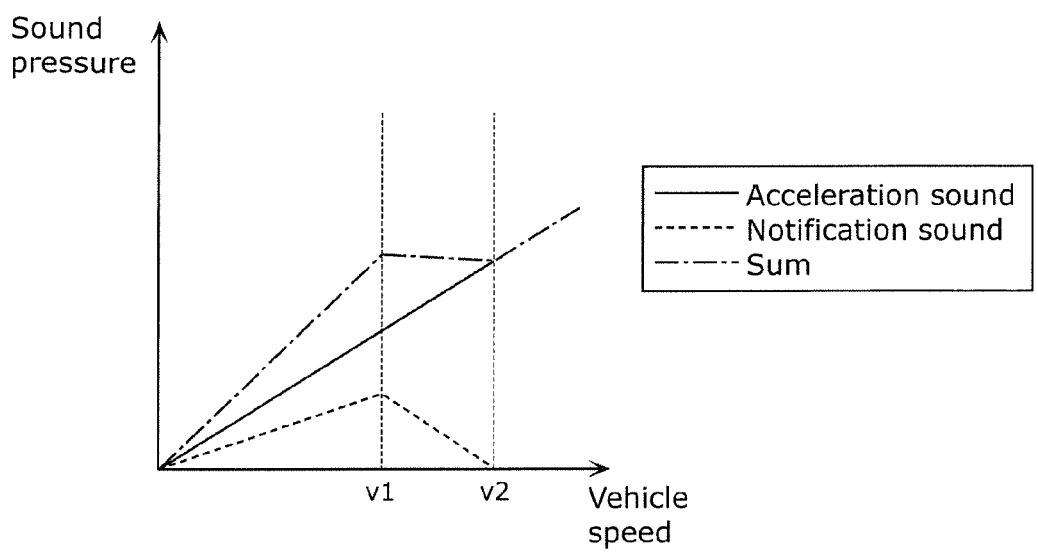
FIG. 5A is a graph showing a relationship between a sound pressure of a notification sound, a sound pressure of an acceleration sound and a sound pressure obtained by summing them in a vehicle interior of a vehicle according to a comparative example, and a vehicle speed.

FIG. 5A is a graph showing a relationship between a sound pressure of a notification sound, a sound pressure of an acceleration sound and a sound pressure obtained by summing them in a vehicle interior of vehicle 200, and a vehicle speed, according to a comparative example.

Figure 5B:
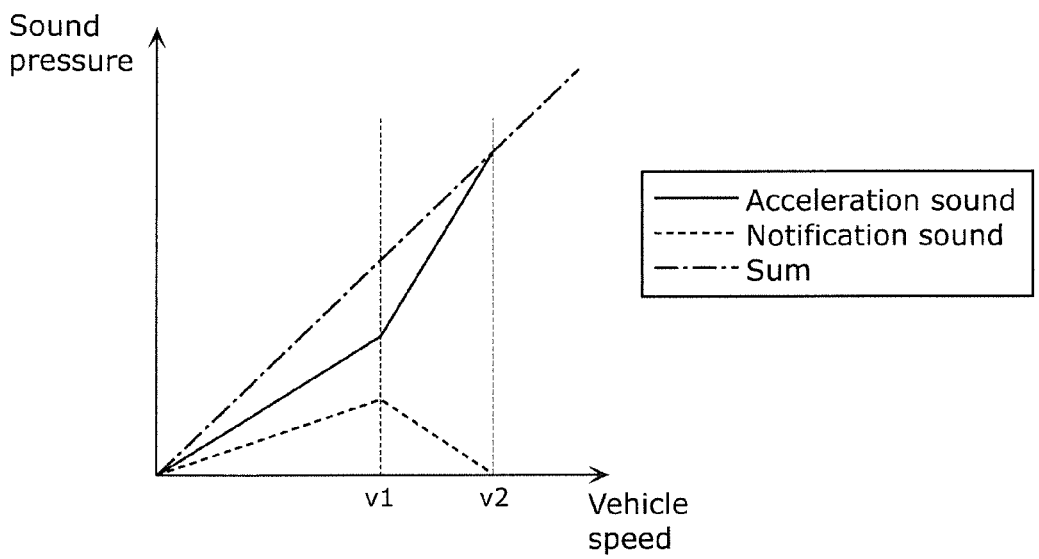
FIG. 5B is a graph showing a relationship between a sound pressure of a notification sound, a sound pressure of an acceleration sound and a sound pressure obtained by summing them in a vehicle interior of the vehicle according to the embodiment, and a vehicle speed and a sound pressure.

FIG. 5B is a graph showing a relationship between a sound pressure of a notification sound, a sound pressure of an acceleration sound and a sound pressure obtained by summing them in a vehicle interior of vehicle 200, and a vehicle speed, according to an embodiment.

Generally, when the vehicle speed increases, road noise (tire pattern noise, etc.) generated from the vehicle also increases. Therefore, it is possible to notify the approach of the vehicle by the road noise without notifying the notification sound to the outside of the vehicle. In other words, when the vehicle speed is low, the notification sound is issued to the outside of the vehicle because the road noise is small. For this reason, as shown in FIG. 5A, when the vehicle speed increases from a low speed (a state in which the vehicle speed is equal to or lower than v1), the notification sound is often output while fading out as in the range from v1 to v2. Similarly, although not shown, when the vehicle speed decreases from a high speed, the notification sound is often output while fading in. Thereby, in the vehicle interior, the notification sound that leaks decreases as the vehicle speed increases, and the notification sound that leaks increases as the vehicle speed decreases. At this time, the sound pressure obtained by summing the sound pressure of the notification sound leaking into the vehicle interior and the sound pressure of the acceleration sound output into the vehicle interior temporarily decreases as shown in FIG. 5A due to the fade-out of the notification sound. Similarly, although not shown, the sound pressure obtained by summing temporarily increases due to the fade-in of the notification sound. For this reason, the passengers hear the sound heard in the vehicle interior suddenly as small or large, and feel uncomfortable.

Therefore, acceleration sound controller 12 processes the sound signal output from sound source 20 such that the sound pressure obtained by summing monotonically increases in accordance with the acceleration of vehicle 200, as shown in FIG. 5B. Specifically, acceleration sound controller 12 increases the sound pressure of the acceleration sound so as to compensate for an amount corresponding to the decrease in the notification sound. Thereby, the sound pressure obtained by summing monotonically increases in accordance with the acceleration of vehicle 200. Similarly, although not shown, acceleration sound controller 12 processes the sound signal output from sound source 20 such that the sound pressure obtained by summing monotonously decreases in accordance with the deceleration of vehicle 200. Specifically, acceleration sound controller 12 reduces the sound pressure of the acceleration sound by an amount corresponding to the increase in the notification sound. Thereby, the sound pressure obtained by summing monotonously decreases in accordance with the deceleration of vehicle 200. In this way, even if the notification sound fades out or fades in, the passengers can hear a sound with a constant ascending or descending rate of the sound pressure, so that it is possible to prevent the passengers from feeling uncomfortable.

Note that the method by which acceleration sound controller processes the sound signal for the acceleration sound in accordance with the acceleration and deceleration of vehicle 200 is not limited. For example, a microphone is provided in the interior of vehicle 200, and the sound signal for the acceleration sound may be processed such that the sound pressure obtained by summing monotonically increases or decreases based on each sound pressure of the leaked notification sound and the acceleration sound output in the vehicle interior collected by the microphone. In addition, for example, data indicating a predetermined correspondence relationship between the speed of the vehicle and the sound pressure of the acceleration sound when the sound pressure obtained by summing monotonically increases or monotonically decreases may be stored in a storage device (not shown). Acceleration sound controller 12 may process the sound signal for the acceleration sound by referring to the correspondence such that the sound pressure obtained by summing monotonically increases or decreases in accordance with the speed of vehicle 200.

In addition, when failure detector 61 detects the failure of first speaker 51, acceleration sound controller 12 may output a sound signal indicating that first speaker 51 has failed to second speaker 52. Since the output of the notification sound by first speaker 51 and the output of the acceleration sound by second speaker 52 cooperate in the present embodiment, the failure of first speaker 51 that outputs the notification sound can be notified to the passengers in the vehicle interior by second speaker 52 that outputs the acceleration sound. For example, a warning sound or voice guidance indicating that first speaker 51 has failed is output from second speaker 52.

Other Embodiments

Although the sound processing device and the vehicle equipped with the sound processing device according to the embodiment of the present disclosure have been described above, the present disclosure is not limited to the above embodiment.

For example, although notification sound controller 11 and acceleration sound controller 12 process the sound signal output from sound source 20, respectively, so as to change the pitches of the notification sound and the acceleration sound at the same ascending rate according to the acceleration of vehicle 200, respectively, and change the pitches of the notification sound and the acceleration sound at the same descending rate according to the deceleration of vehicle 200, respectively, in the above embodiment, the processing may not be performed.

In addition, although for example, acceleration sound controller 12 processes the sound signal output from sound source 20 such that the sound pressure obtained by summing the sound pressure of the notification sound leaking into the vehicle interior and the sound pressure of the acceleration sound output into the vehicle interior monotonically increases in accordance with the acceleration of vehicle 200, and the sound pressure obtained by summing monotonically decreases in accordance with the deceleration of vehicle 200 in the above embodiment, the processing may not be performed.

In addition, although for example, failure detector 61 is provided in first amplifier 41 in the above embodiment, it may be provided in another component of sound processing device 100. In addition, sound processing device 100 may not include failure detector 61.

Note that the present disclosure can be realized not only as a sound processing device, but also as a sound processing method including steps (processes) performed by each component configuring the sound processing device.

Specifically, as shown in FIG. 3, in the sound processing method, a common sound signal is output to first speaker 51 for the vehicle exterior and second speaker 52 for the vehicle interior that are mounted on vehicle 200 (step S11), a signal corresponding to a notification sound for notifying the approach of vehicle 200 based on the output sound signal is output to first speaker 51 (step S12), and a signal corresponding to an acceleration sound of vehicle 200 based on the output sound signal is output to second speaker 52 (step S13).

For example, the steps in the sound processing method may be executed by a computer (computer system). Then, the present disclosure can be realized as a program for causing a computer to execute the steps included in the sound processing method.

Furthermore, the present disclosure can be realized as a non-transitory computer-readable recording medium such as a CD-ROM in which the program is recorded.

For example, when the present disclosure is realized by a program (software), each step is executed by executing the program using hardware resources such as a CPU, a memory, and an input/output circuit of a computer. That is, each step is executed by the CPU acquiring data from the memory, the input/output circuit or the like and performing an operation, or outputting an operation result to the memory, the input/output circuit or the like.

In addition, each component included in the sound processing device according to the above embodiments may be realized as a dedicated or general-purpose circuit.

In addition, each component included in the sound processing device of the above embodiments may be realized as an LSI (Large Scale Integration) that is an integrated circuit (IC).

In addition, the integrated circuit is not limited to an LSI, and may be realized by a dedicated circuit or a general-purpose processor. A programmable FPGA (Field Programmable Gate Array) or a reconfigurable processor in which the connection and setting of circuit cells inside the LSI can be reconfigured may be used.

Furthermore, if an integrated circuit technology that replaces the LSI appears due to the advancement of the semiconductor technology or another technology derived therefrom, naturally, each component included in the sound processing device may be integrated using the technology.

In addition, a form obtained by performing various modifications that can be conceived by those skilled in the art to the embodiment, and a form realized by arbitrarily combining the components and functions in each embodiment without departing from the spirit of the present disclosure are also included in this disclosure.

While various embodiments have been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosure of the following Japanese Patent Application including specification, drawings and claims are incorporated herein by reference in its entirety: Japanese Patent Application No. 2019-059677 filed on Mar. 27, 2019.

INDUSTRIAL APPLICABILITY

The present disclosure can be applied to a sound processing device mounted on a low-noise vehicle and the like such as an electric vehicle and a hybrid vehicle.

The invention claimed is:

1. A sound processing device, comprising:
a sound source that outputs a sound signal to a first speaker for a vehicle exterior and a second speaker for a vehicle interior that are provided in the vehicle, the sound signal being common to the first speaker and the second speaker;
a notification sound controller that outputs a signal corresponding to a notification sound for notifying approach of the vehicle to the first speaker based on the sound signal output from the sound source; and
an acceleration sound controller that outputs a signal corresponding to an acceleration sound of the vehicle to the second speaker based on the sound signal output from the sound source,
wherein
the acceleration sound controller processes the sound signal output from the sound source to monotonically increase a sound pressure obtained by summing a sound pressure of the notification sound leaking into the vehicle interior and a sound pressure of the acceleration sound output into the vehicle interior in accordance with acceleration of the vehicle, and monotonously decrease the sound pressure obtained by summing in accordance with deceleration of the vehicle.

2. The sound processing device according to claim 1, further comprising:
a filter that has a pass band that is a predetermined frequency band, wherein
the notification sound controller outputs a signal corresponding to the notification sound to the first speaker based on the sound signal output from the sound source and passing through the filter.

3. The sound processing device according to claim 1, wherein
the notification sound controller and the acceleration sound controller each processes the sound signal output from the sound source, so as to change a pitch of the notification sound and a pitch of the acceleration sound at a same ascending rate in accordance with acceleration of the vehicle, respectively, and change the pitch of the notification sound and the pitch of the acceleration sound at a same descending rate in accordance with deceleration of the vehicle, respectively.

4. The sound processing device according to claim 1, further comprising:
a failure detector that detects a failure of the first speaker, wherein
when the acceleration sound controller detects the failure of the first speaker, the acceleration sound controller outputs a sound signal indicating that the first speaker has failed to the second speaker.

5. A vehicle, comprising:
the sound processing device according to claim 1;
the first speaker; and
the second speaker.

6. A sound processing method, comprising:
outputting, by a sound source, a sound signal to a first speaker for a vehicle exterior and a second speaker for a vehicle interior that are provided in the vehicle, the sound signal being common to the first speaker and the second speaker;
outputting, by a notification sound controller, a signal corresponding to a notification sound for notifying an approach of the vehicle based on the sound signal output;

outputting, by an acceleration sound controller, a signal corresponding to an acceleration sound of the vehicle to the second speaker based on the sound signal output; and processing, by the acceleration sound controller, the sound signal output to monotonically increase a sound pressure obtained by summing a sound pressure of the notification sound leaking into the vehicle interior and a sound pressure of the acceleration sound output into the vehicle interior in accordance with acceleration of the vehicle, and monotonously decrease the sound pressure obtained by summing in accordance with deceleration of the vehicle.

* * * * *